United States Patent

[11] 3,549,857

| [72] | Inventors | James C. Needham<br>Walden;<br>Albert W. Carter, Stapleford, England |
|---|---|---|
| [21] | Appl. No. | 718,503 |
| [22] | Filed | Apr. 3, 1968 |
| [45] | Patented | Dec. 22, 1970 |
| [73] | Assignee | British Welding Research Association<br>Abington, Cambridge, England<br>a British Body corporate |
| [32] | Priority | Apr. 5, 1967 |
| [33] | | Great Britain |
| [31] | | No. 15,693/67 |

[54] WELDING PROCESSES AND APPARATUS
9 Claims, 8 Drawing Figs.

[52] U.S. Cl............................................. 219/137,
219/130, 219/131
[51] Int. Cl............................................. B23k 9/00
[50] Field of Search........................................ 219/74, 75,
130, 131, 137, 135

[56] References Cited
UNITED STATES PATENTS

| 3,309,491 | 3/1967 | Jacobs............................ | 219/137X |
| 2,756,311 | 7/1956 | Persson et al.................. | 219/130 |
| 2,791,673 | 5/1957 | Arnaud.......................... | 219/74 |
| 3,278,720 | 10/1966 | Dixon............................. | 219/74X |
| 3,319,043 | 5/1967 | Rohrberg...................... | 219/137 |
| 3,336,460 | 8/1967 | Hauck et al.................... | 219/131X |

*Primary Examiner*—J. V. Truhe
*Assistant Examiner*—C. L. Albritton
*Attorney*—Kemon, Palmer & Estabrook

ABSTRACT: In a consumable electrode arc welding process, the workpiece is preheated by an arc from a gas shielded tungsten electrode spaced from the consumable electrode by a distance such that the tungsten electrode arc does not extend to a weld pool produced on the workpiece by the consumable electrode; the consumable electrode is connected to the positive terminal of a common electrical supply and the tungsten electrode to the negative terminal of the supply so that the two arcs are electrically in series. Alternatively, the tungsten electrode can be used to reheat a weld made by the consumable electrode to provide a desired finish.

PATENTED DEC 22 1970 3,549,857

Inventors
James C. Needham
Albert W. Carter
By Kenyon & Kenyon
Reilly Carr & Chapin
Attorneys

WELDING PROCESSES AND APPARATUS

This invention is concerned with welding processes of the kind employing a consumable metal electrode, for example processes employing an inert gas or other shielding gas. Generally, in such processes the heat input needed for adequate fusion of the work is greater than the heat required to burn off a relatively thin electrode wire. To allow space for the quantity of metal burned away from the electrode at the current needed for sufficient penetration of the workpiece, it is often necessary to carry out a large amount of edge preparation (that is to say removal of metal along the weld path) in order to accommodate what would otherwise be an excessive reinforcement of electrode metal at the weld surface. This limitation could, of course, be overcome if a greater current could be passed for a given feed rate. However, this is not normally possible as once the material, the shielding gas, the wire diameter and the other variables have been settled, taking account of the metallurgical and other welding considerations, the burn-off factor is fixed immutably by the welding characteristics of the arc.

Although preheating of the work can be used, there are several disadvantages, including the difficulty of obtaining an even temperature distribution.

We have found, however, that unexpected advantages accrue from using a nonconsumable tungsten arc with a shielding gas for supplementary heating. Not only does it provide additional heating and enable better weld penetration and quality, but also the two electrodes of the two arc systems can be advantageously connected to opposite terminals of a single power supply so that they are electrically connected in series with one another and with the same power supply during welding. In the first place it is usually advantageous to operate gas shielded metal arc systems employing a consumable electrode from a DC electrical supply with the electrode wire at a positive polarity with respect to the work; and it is usually advantageous to operate the tungsten inert gas process from a DC electrical supply with the electrode negative with respect to the work. Thus, by connecting the two electrodes to their appropriate polarities both requirements can be satisfied simultaneously in the single series-connected circuit. In the second place, if the power source and operating parameters are suitably chosen, each arc system will see in the series combination of the power supply and the other system, a power input having the characteristics which it requires. Because a single power source can be used, the better results are obtained with an economy of equipment and an economy of power that is surprising.

According to the present invention therefore, a workpiece is heated both by an arc from a consumable electrode and by an arc from a tungsten electrode, shielded by a gas inert to tungsten, the consumable electrode being connected to the positive terminal and the tungsten electrode to the negative terminal of a common electrical supply. In the preferred arrangement, in which the nonconsumable tungsten electrode arc provides the preheating for the consumable electrode arc, the workpiece and a welding head carrying the two electrodes are given a relative movement such that the tungsten electrode precedes the consumable electrode. It is, however, possible to use the tungsten arc to provide after-heating in order to give the weld deposit a "costmetic" finish. If desired, tungsten arcs may be provided both before and after the consumable electrode arc to give both the preheating and the cosmetic finish. In this case, the return current may be shared between the two tungsten arcs either equally or unequally as desired.

The improvement in quality which is obtained when a tungsten arc is used as a preheating source for a consumable electrode system is of the kind which would be expected for the latter system alone if it were using a much higher operating current. As an example, with a consumable steel electrode in a carbon dioxide gas shield, operating in a short-circuiting manner (without a tungsten arc), the penetration of the weld pool or fused zone was reduced very sharply towards the edges of the weld pool. When the tungsten arc system was used as a preheating source, the penetration towards the edges of the weld pool was greatly increased and the width of the weld bead was also increased.

However, the advantages of the invention are not confined to gas-shielded short circuit transfer welding; the gas-shielded tungsten arc can also be usefully added in the single electrical supply circuit, in gas-shielded consumable electrode processes using spray transfer welding or globular transfer welding, or using pulsed current welding, and also in submerged-arc consumable electrode welding. For the purposes of the present specification, the expression gas-shielded tungsten arc welding is intended to include plasma arc welding of the kind known as transferred or constricted plasma arc welding.

We have already referred to the fact that if a suitable power source is used, each of the two arcs sees the power source and the other arc as a combination having the characteristic which it requires. This result is achieved if a constant potential or "flat characteristic" power source is used with a self-adjusting consumable electrode system and the tungsten arc system. The power source thus has the characteristic required by a self-adjusting consumable electrode system, as it allows the current to adapt to requirement (dictated by the wire feed rate) without an excessive change in arc voltage. The presence of the tungsten arc, which has a nominally flat voltage/current characteristic, only subtracts this voltage from that available from the flat characteristic power source and therefore if the power source voltage is increased to offset the voltage drop across the tungsten arc (about 7 to 10 volts), it is still satisfactory for the consumable electrode arc.

The constant potential power source would not usually be thought satisfactory for a tungsten arc, which requires a steeply drooping or constant current power supply. However, the process (as distinct from the arc) characteristic of a self-adjusting consumable electrode system is analogous to a controlled current supply, since over a range of operating arc voltages, the current taken by the consumable electrode system is substantially constant and dependent on the preset wire feed speed alone. Therefore, from the viewpoint of the tungsten arc, the consumable electrode system with its power source presents a constant current source, even though the power source itself is of the constant potential type.

Another advantage of the arrangement according to the invention is that if the two arcs are to draw the same current, there need be no permanent connection to the workpiece. This is of particular importance in the welding of moving or rotating components, since it is unnecessary to connect an earth return through bearings or slip rings to the component.

In order that the invention may be better understood, apparatus for carrying the invention into effect and the results achieved by such apparatus will now be described with reference to the accompanying drawings, in which.

Figure 1:
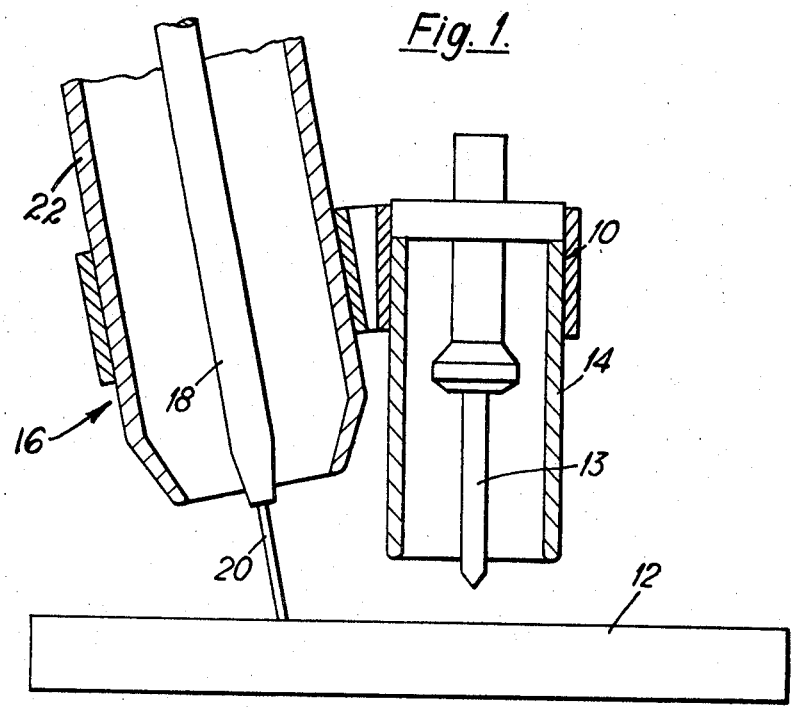
FIG. 1 shows an arrangement of welding heads for carrying out the method according to the invention.

As shown in FIG. 1, the tungsten electrode torch 10 is mounted perpendicularly to the workpiece 12. The tungsten electrode 13 is coaxially arranged in an annular housing 14 through which an inert gas is directed at the workpiece.

The consumable electrode torch 16 is mounted at an angle of 8° to the vertical, with respect to the horizontal workpiece 12. The guide tube 18 for the consumable electrode wire 20 is coaxially mounted in an annular housing 22 through which an annular stream of inert gas is directed at the workpiece. Thus, both the consumable electrode arc and the tungsten electrode arc are shielded with inert gas.

The two torches are mounted in a common block with spacer to adjust their separation. Generally speaking the separation is between 1 inch and 2½ inches. For such an arrangement, a tungsten electrode having a diameter of ⅛ inches can be used with currents in excess of 200 amps. and the arc gap can be set at ⅛ inches. Typically, for the consumable electrode system, the wire feed speed can use 200 inches per minute for a steel wire of diameter 3/64 inches. As shown in the diagram, the power source is connected directly across the consumable electrode and tungsten arcs with the consumable electrode of positive polarity and the tungsten electrode of negative polarity. No permanent connection need by made to the workpiece. We have found no significant interference between the two gas shields; we have used argon for the tungsten arc and carbon dioxide or a standard argon mixture for the consumable electrode arc, with steel workpieces.

Figure 2A:
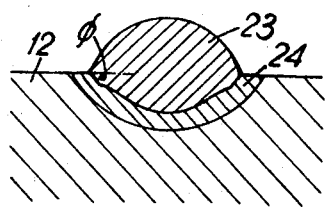
FIGS. 2a, 2b, 2c and 2d are diagrams showing penetration in welds produced with and without the present invention.
Figure 2C:
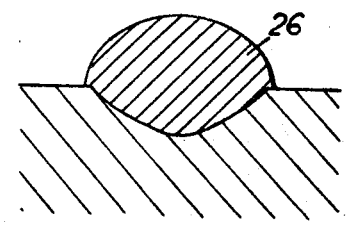
Figure 2B:
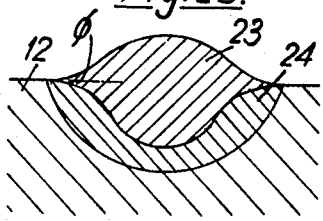

FIG. 2a is a diagrammatic reproduction of a photographic macrosection of an etched weld produced by a consumable electrode inert gas welding of the short circuit transfer kind with a steel workpiece and using carbon dioxide as the shielding gas. A current of 190 amps was used. FIG. 2b shows the weld produced when a tungsten inert gas arc system was used to preheat the workpiece, in an arrangement similar to that shown in FIG. 1. The separation between the two arcs was ⅞ inches, the tungsten arc length was ⅛ inches. In both cases the wire feed speed was 190 inches per minute, and the relative travel speed between the workpiece and the welding heads was one-tenth of the wire feed speed.

It will be apparent from a comparison of FIGS. 2a and 2b that the system employing the series-connected consumable electrode arc and the tungsten arc not only give increased penetration but also provide an improvement in the fused zone profile. The "bead" 23 is wider and has a lower contact angle $\Phi$ where the fused material meets the surface of the parent plate 12; that is to say, it has a better wetting action. There is also a broader heat-affected zone 24, which is desirable since it shows that there was not a sharp temperature gradient during the welding operation and consequently better characteristics can be expected from the welded workpiece in the region surrounding the weld; such a weld is less likely to suffer from fatigue failures. Because of the better penetration and the wider weld bead, the area of fused metal is approximately doubled. The wider heat-affected zone is of particular benefit for alloy steels.

Figure 2D:
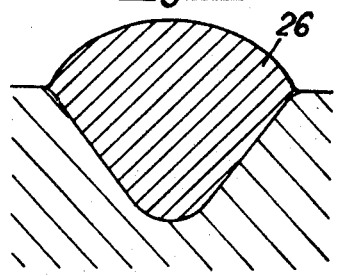
Figure 5:
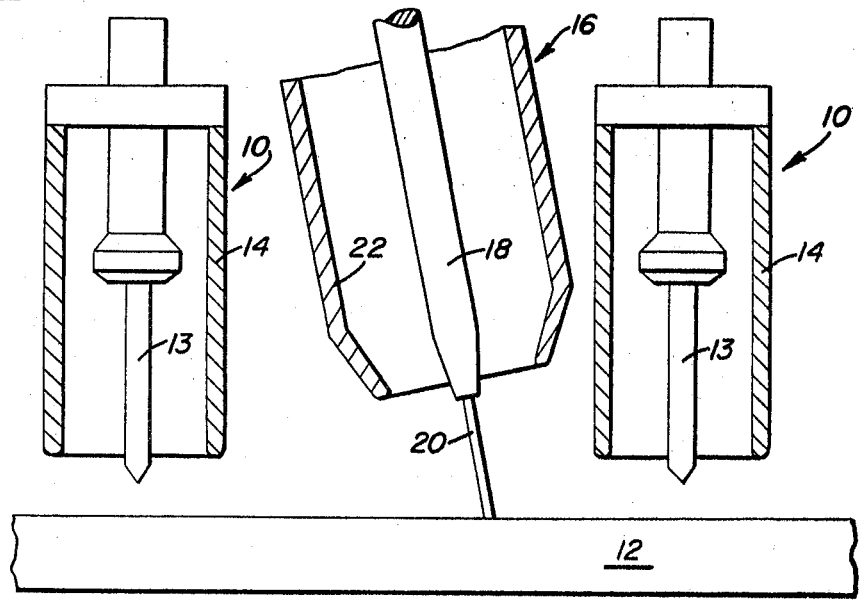
FIG. 5 is a view similar to FIG. 1 but showing use of a pair of tungsten electrodes, one preceding and the other following the consumable electrode.

The increased penetration and wider weld bead are even more significant in the case of aluminum. FIG. 2c shows a weld bead 26 made by the consumable electrode process at a current of 130 amps, a wire feed speed of 130 inches per minute, and a relative speed between welding head and workpiece of 13 inches per minute. The shielding gas was argon. FIG. 2d shows a section through a weld produced with the same current, feed speed and traverse speed and with the same shielding gas, but with the addition of the series-connected tungsten arc. In this case the penetration achieved is some three times the penetration obtained in FIG. 2c. The heat-affected zone is not shown in FIGS. 2c and 2d because in aluminum it does not become apparent on etching. As examples of preferred conditions for desired penetration characteristics, we have found by experiment that when welding with steel wire with the two arcs in series and with wire feed speeds below 200 inches per minute, for weld speeds with width-to-depth ratios of 3:1 or less, it is preferable to use short circuit welding with carbon dioxide as the shielding gas; for the same wire with wire feed speeds in excess of 300 inches per minute, we prefer to use spray transfer welding with a shielding gas consisting of 80 percent argon and 20 percent carbon dioxide. For width-to-depth ratios in excess of 8:1, we prefer to use a low wire feed speed with globular transfer, and with a shielding gas consisting of 80 percent argon and 20 percent carbon dioxide.

In general, for short circuit transfer operation with the two arcs in series, the power source voltage required is typically that of a power source used with a consumable electrode arc alone in spray transfer, that is to say about 40 volts. For spray transfer with the two arcs in series, a power source of 55 to 60 volts is needed.

For high current operation, more than one tungsten arc can be used to broaden the strip of preheated metal in the plate. These tungsten electrodes then share the return current. The width-to-depth ratio of the penetration achieved depends on whether the two tungsten arcs are in line with the deposited weld bead or transverse to this bead. The system employing the two arcs in series has an inherent stability. For example, in short circuiting work at low system voltages the consumable electrode arc is unstable and tends to shorten towards the workpiece and extinguish between short circuits. This does not, however, lead to a total interruption and the system restarts as soon as the wire touches the work again; this is because the tungsten arc can reignite after a short interval merely by reestablishing the system voltage across the tungsten arc. Thus, even with an unstable consumable electrode arc, continuity of operation is ensured if a pilot arc can be maintained between the tungsten electrode and the workpiece or if the tungsten arc can be reignited by, for example, high frequency spark injection, or from an auxiliary supply.

Figure 3:
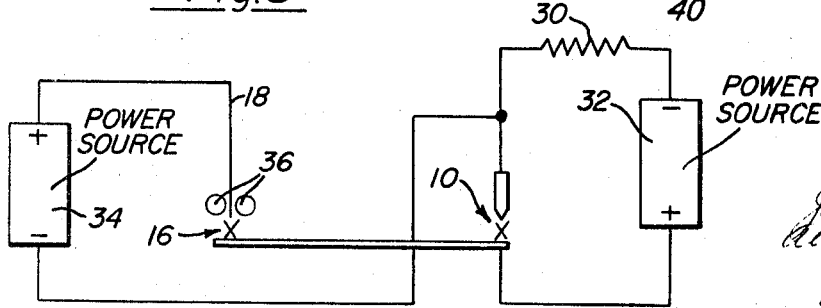

FIG. 3 shows a simple circuit utilising the present invention in which the tungsten torch 10 is connected through a resistor 30 across a first power source 32 having, for example, an open circuit voltage of 100 volts and a current output of 10 amps. A second power supply 34, with an open circuit voltage of 40 volts and a current capacity of 200 amps, has one terminal connected to the consumable electrode 18, which passes between the rolls 36 in torch 16, and has its negative terminal connected to the tungsten torch 10. In this example, the positive terminal of the power source 32 is connected to the workpiece. If the consumable electrode arc is extinguished, the wire 18 continues to feed towards the workpiece and on contact with the workpiece a short circuit is established through the electrode wire and the tungsten arc. This immediately reestablishes the consumable electrode arc.

For starting, the pilot arc can be struck between the tungsten electrode and the torch body, after which the consumable electrode arc is started by feeding the wire electrode forward. The positive bias imparted to the work when it is contacted by the wire then transfers the pilot tungsten arc from the torch body to the workpiece.

To strike the pilot arc, the positive connection from the supply 32 is transferred to the body of the tungsten torch. In an alternative circuit, the supply 32 is ommitted and an electrical connection, including a resistance, is taken from the body of the tungsten torch to the contact tube of the consumable electrode torch, to permit the pilot arc to be struck between the electrode and torch body.

Figure 4:
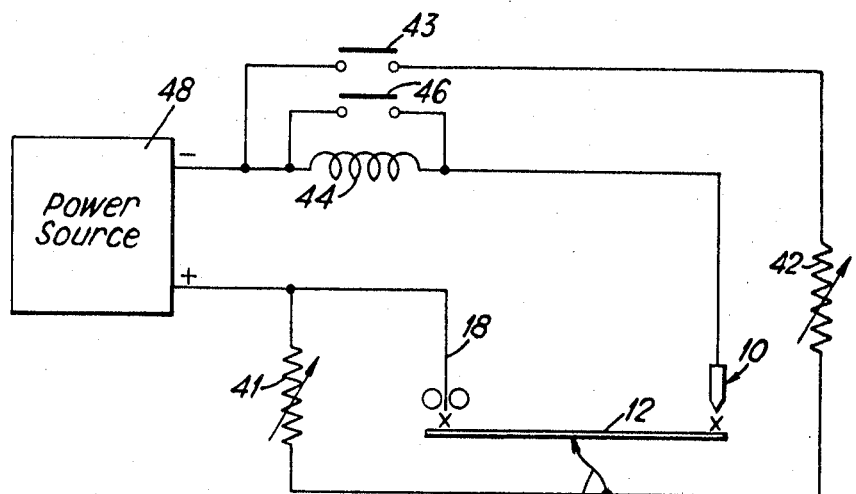
FIGS. 3 and 4 show starting arrangements for apparatus of the kind shown in FIG. 1.

FIG. 4 shows a slightly more sophisticated circuit in which the tungsten arc is initiated by way of a temporary connection 40 to the workpiece 12 and a starting resistor 41. This provides a separate circuit for a pilot arc from the tungsten electrode 10 to the work. Once this tungsten arc is established, the consumable electrode arc can be struck between the electrode 18 and the workpiece in the usual way. The temporary connection is then removed. However, to avoid too much of the initial starting short circuit current flowing through the tungsten arc, a bypass resistor 42 is connected in parallel with the tungsten arc through a contact 43 and a starting choke 44 is connected in series with the tungsten arc by the opening of a contact 46. The inductance of the choke temporarily opposes the initial high starting current flow and reduces the demand on the tungsten arc until its cathode has reached normal operating conditions.

The power source 48 is of a kind having a flat characteristic for the reasons discussed above. It is not, however, essential to use such a power source and it would be possible to find a further combination of operating conditions using the consumable electrode in a controlled-arc system with a constant current or steeply drooping power source. However, such a system requires a power source having a larger kilovolt-ampere rating and a wire feed speed which is dependent on the arc voltage. We therefore prefer to use a flat characteristic power source.

If for any reason it is desired to use different currents for the tungsten and consumable electrode arcs, bypass resistors can be arranged in parallel with the arc which is to carry the lower current.

It will be seen from the above description that the combination of the two arcs in series enables extra heat to be introduced into the plate without laying down more metal, and thus permits better penetration, and that the connection of the two arcs in a series circuit has a number of unexpected advantages from the point of view of the electrical power supply. The weld bead has a smoother profile and there is better "wetting" at the edges of the bead for the same wire feed speed and workpiece traverse rate.

We claim:

1. An arc welding process of the kind in which a consumable electrode is fed through a torch nozzle towards a workpiece and an arc is struck from the consumable electrode to the workpiece, and in which the workpiece is additionally heated by an arc from a gas-shielded tungsten electrode, the consumable electrode and tungsten electrode being respectively electrically connected to the positive terminal and negative terminal of a common electrical supply so that the arcs are in series with one another, the tungsten electrode being spaced from the consumable electrode so that when a workpiece is subjected to the action of the two arcs the tungsten electrode arc does not extend to a weld pool formed at the workpiece by the consumable electrode.

2. An arc welding process of the kind in which a consumable electrode is fed towards a workpiece though a first torch nozzle in a gas shield emerging from the said nozzle and an arc is struck from the consumable electrode to the workpiece, and in which the workpiece is additionally heated by an arc from a tungsten electrode arranged in a further torch nozzle through which emerges a gas inert to tungsten, the consumable electrode and tungsten electrode being respectively electrically connected to the positive terminal and negative terminal of a common electrical supply so that the arcs are in series with one another, the spacing between the said nozzle being such that when a workpiece is subjected to the action of the two arcs the tungsten electrode arc does not extend to a weld pool formed at the workpiece by the consumable electrode.

3. An arc welding process in accordance with claim 1, in which there is relative movement between the said electrodes, on the one hand, and the workpiece, on the other hand, in such a sense that the tungsten electrode arc preheats the parts of the workpiece in its path before these parts are reached by the consumable electrode arc.

4. A process according to claim 1, in which there is relative movement between the said electrodes, on the one hand, and the workpiece, on the other hand, in a direction such that the tungsten electrode arc reheats parts of the workpiece which have been welded by the consumable electrode arc to give them a desired finish.

5. Apparatus for carrying out gas-shielded arc welding comprising: a consumable metal electrode; a torch body for guiding the consumable metal electrode towards a workpiece; feeding means for advancing the consumable metal electrode through the torch body; a tungsten electrode; a torch body for the tungsten electrode; a nozzle for directing a shielding gas around the tip of the tungsten electrode; spacing means interconnecting the two torch bodies to maintain a desired distance between them so that when the apparatus is in operation adjacent a workpiece the tungsten electrode arc does not extend to a weld pool on the workpiece produced by the consumable electrode; and electrical connections from the two electrodes for connecting the consumable metal electrode to a positive supply terminal and the tungsten electrode to a negative supply terminal of a common power source.

6. Apparatus in accordance with claim 5, including a bypass resistor connected across one of the arcs to carry a part of the current passed by the other arc.

7. Apparatus in accordance with claim 5, including two tungsten electrode torches, one arranged on one side of the consumable electrode torch and the other arranged on the other side of the consumable electrode torch, whereby if one tungsten electrode torch precedes the consumable electrode torch to provide preheating of the workpiece, the other will follow the consumable electrode torch to provide a smoother finish to the resulting weld.

8. Apparatus in accordance with claim 5, including means for establishing a temporary earth connection to the workpiece through a starting resistor.

9. Apparatus for carrying out arc welding, comprising: a consumable metal electrode, a housing for guiding said consumable metal electrode towards a workpiece; feeding means for advancing said consumable metal electrode through the said housing; a torch body and a tungsten electrode within said torch body; a nozzle for directing a shielding gas around the tip of the tungsten electrode; spacing means interconnecting the two electrodes to maintain a desired distance between them so that when the apparatus is in operation adjacent a workpiece the tungsten electrode arc does not extend to a weld pool on the workpiece produced by the consumable electrode; an electrical power source having a substantially flat voltage-current characteristic and electrical connections from the two electrodes for connecting the consumable electrode to a positive supply terminal of the power source and the tungsten electrode to a negative supply terminal of the power source, whereby the consumable electrode system is of the constant-potential self-adjusting kind and the supply circuit for the tungsten electrode consists of the said power source and the consumable electrode in a series and is of the constant-current kind.